(12) United States Patent
Olivarez et al.

(10) Patent No.: US 9,359,949 B2
(45) Date of Patent: Jun. 7, 2016

(54) DISTRIBUTED BLEED SYSTEM TEMPERATURE MANAGEMENT

(75) Inventors: Jason Olivarez, Tempe, AZ (US); Giorgio Isella, Culver City, CA (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 401 days.

(21) Appl. No.: 13/029,874

(22) Filed: Feb. 17, 2011

(65) Prior Publication Data

US 2012/0210721 A1     Aug. 23, 2012

(51) Int. Cl.
*F24F 7/00* (2006.01)
*F02C 6/08* (2006.01)
*F02C 9/00* (2006.01)

(52) U.S. Cl.
CPC ... *F02C 6/08* (2013.01); *F02C 9/00* (2013.01); Y02T 50/671 (2013.01)

(58) Field of Classification Search
CPC ...................................... F02C 6/08; F02C 9/00
USPC ............ 62/87, 172, 402; 60/782, 795; 454/71
See application file for complete search history.

(56) References Cited

U.S. PATENT DOCUMENTS

| | | | |
|---|---|---|---|
| 2,937,011 A | | 5/1960 | Brahm |
| 3,177,679 A | * | 4/1965 | Quick et al. .................... 62/402 |
| 3,711,044 A | * | 1/1973 | Matulich ..................... 244/118.5 |
| 5,155,991 A | * | 10/1992 | Bruun ............................. 60/785 |
| 5,511,385 A | * | 4/1996 | Drew et al. ..................... 62/172 |
| 5,906,111 A | * | 5/1999 | Lui ......................... B64D 13/06 62/172 |
| 6,012,515 A | | 1/2000 | Stubbendorff |
| 6,306,032 B1 | | 10/2001 | Scheffler |
| 6,494,047 B2 | * | 12/2002 | Yeung .............................. 60/782 |
| 6,782,701 B2 | * | 8/2004 | Liu et al. ......................... 60/782 |
| 7,036,319 B2 | * | 5/2006 | Saunders .................. F02C 6/02 60/782 |
| 7,536,865 B2 | * | 5/2009 | Mikhail .......................... 60/795 |
| 7,854,412 B2 | | 12/2010 | Al-Khalid |

(Continued)

FOREIGN PATENT DOCUMENTS

| | | |
|---|---|---|
| FR | 2485473 A1 | 12/1981 |
| FR | 2485473 A1 * | 12/1981 ............. B64D 13/08 |
| GB | 1383705 | 2/1975 |

OTHER PUBLICATIONS

Temperature Sensors: Performance Characteristics, Oct. 2003, pp. 1-8.*

(Continued)

*Primary Examiner* — M. Alexander Elve
*Assistant Examiner* — Larry Furdge
(74) *Attorney, Agent, or Firm* — Shimokaji IP

(57) ABSTRACT

A distributed bleed system temperature management scheme utilizes a distributed, closed loop temperature protection function. By allowing consumer systems to limit the consumer flow to meet a specified bleed system outlet temperature (which may be different for each consumer or group of consumers), each system can be penalized according to their level of importance. The closed loop approach allows optimization of the performance reduction instead of relying on conservative assumptions as is done with conventional systems. In some embodiments, each consumer system may have a different temperature limit at which the consumed flow is limited to maintain a given bleed system exit temperature. The temperature setpoints may be separated by a minimum temperature, based on sensor and controls tolerances, to ensure that the flow limiting functions do not interact with each other.

12 Claims, 1 Drawing Sheet

(56) References Cited

U.S. PATENT DOCUMENTS

| | | | | |
|---|---|---|---|---|
| 8,336,821 | B2* | 12/2012 | Shell et al. | 244/118.5 |
| 2005/0051668 | A1* | 3/2005 | Atkey et al. | 244/118.5 |
| 2008/0179052 | A1* | 7/2008 | Kates | 165/208 |
| 2009/0221224 | A1 | 9/2009 | Centofante | |
| 2009/0235670 | A1* | 9/2009 | Rostek et al. | 60/785 |
| 2009/0326737 | A1 | 12/2009 | Derouineau et al. | |

OTHER PUBLICATIONS

Shang, et al., "Development of High Performance Aircraft Bleed Air Temperature Control System With Reduced Ram Air Usage", IEEE Transactions on Control Systems Technology, vol. 18, Issue 2, pp. 438-445, Mar. 2010.

* cited by examiner

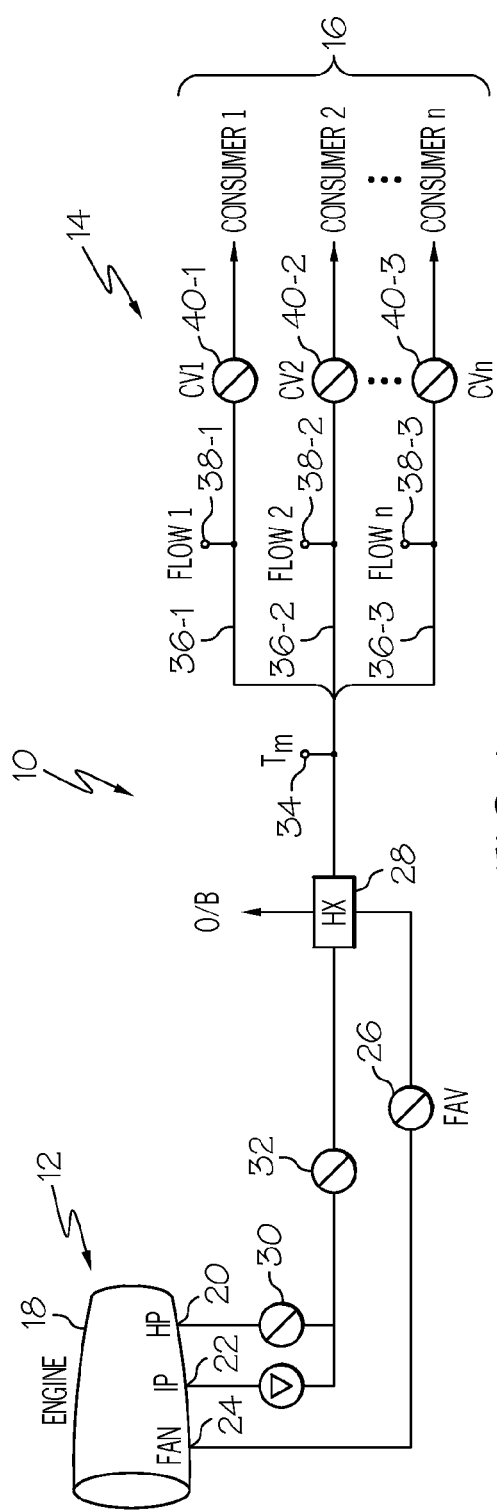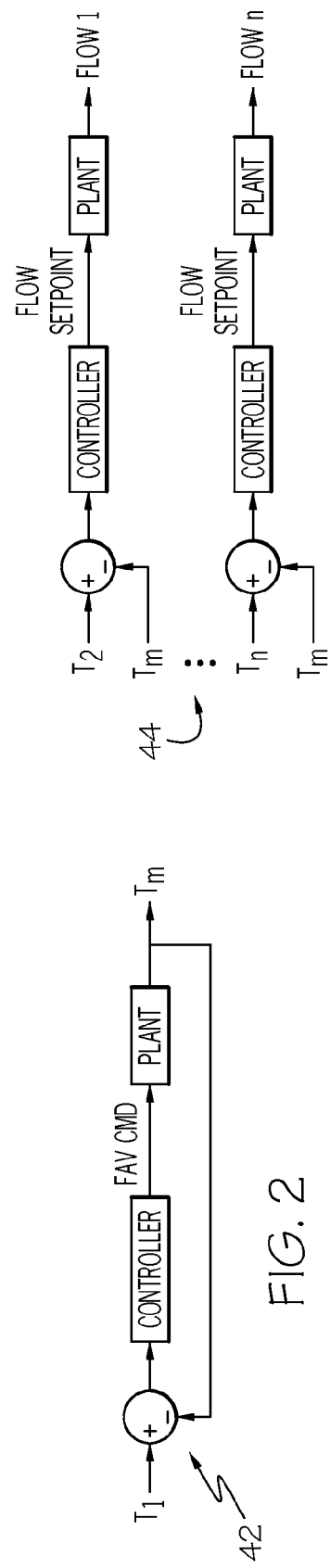
FIG. 1
FIG. 2
FIG. 3

US 9,359,949 B2

DISTRIBUTED BLEED SYSTEM TEMPERATURE MANAGEMENT

BACKGROUND OF THE INVENTION

The present invention relates to apparatus and methods for managing engine bleed air distribution and, more particularly, apparatus and methods for managing engine bleed air distribution based on consumer flow control.

In order to save weight, engine bleed air systems are designed with the thermal capacity to reduce the bleed air temperature to desired levels at typical, rather than worst case, operating points. In order to ensure that bleed air system overtemperature does not occur during abnormal or failure scenarios, a temperature protection function is required.

Typical temperature protection functions on conventional aircraft bleed air systems utilize the pressure regulation valve to limit the available pressure to consumer systems in order to reduce the level of hot side flow and thus the bleed system exit temperature. This method, although effective, penalizes all of the consumer systems equally when the performance of some may be more critical than others.

Other approaches that use the consumer systems to limit the hot side engine bleed flow rely on open loop limits to determine the level of flow consumption. These have the disadvantage of requiring conservative assumptions to be used for the condition based limits in order to ensure that overtemperature is avoided during the worst case scenarios.

As can be seen, there is a need for a bleed system management scheme that may allow consumer systems to limit the consumer flow to meet a specified bleed system outlet temperature.

SUMMARY OF THE INVENTION

In one aspect of the present invention, a distributed bleed air management system comprises a temperature sensor adapted to sense the temperature of temperature-regulated bleed air; a plurality of bleed air flow lines, each of the plurality of bleed air flow lines delivering bleed air to one or more consumers; a load control valve located on each of the plurality of bleed air flow lines, the load control valve controlling flow of bleed air through each of the plurality of bleed air flow lines based on needs of each of the consumers.

In another aspect of the present invention, a method for controlling bleed air flow to a plurality of consumers comprises splitting a flow of bleed air to a plurality of consumers; determining an amount of the flow to be delivered to each consumer based on the importance of each consumer; and controlling the amount of the flow to be delivered to each consumer.

In a further aspect of the present invention, a method for controlling bleed air flow to a plurality of consumers comprises splitting a flow of bleed air to a plurality of consumers; measuring bleed air temperature output from an engine; assigning a temperature setpoint to each of the consumers; determining an amount of the flow to be delivered to each consumer based on the temperature setpoint of each consumer; and controlling the amount of the flow to be delivered to each consumer, wherein the temperature setpoint is set based in the importance of each of the consumers.

These and other features, aspects and advantages of the present invention will become better understood with reference to the following drawings, description and claims.

BRIEF DESCRIPTION OF THE DRAWINGS

FIG. 1 is schematic diagram showing an engine bleed temperature management system according to an exemplary embodiment of the present invention;

FIG. 2 is a schematic diagram showing an engine bleed temperature management loop for a standard control setpoint; and FIG. 3 is a schematic diagram showing an engine bleed temperature management loop for a consumer-based control setpoint.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention provide a distributed bleed system temperature management scheme that utilizes a distributed, closed loop temperature protection function. By allowing consumer systems to limit the consumer flow to meet a specified bleed system outlet temperature (which may be different for each consumer or group of consumers), each system can be penalized according to its level of importance. The closed loop approach allows optimization of the performance reduction instead of relying on conservative assumptions as is done with conventional systems. In some embodiments, each consumer system may have a different temperature limit at which the consumed flow is limited to maintain a given bleed system exit temperature. The temperature setpoints may be separated by a minimum temperature, based on sensor and controls tolerances, to ensure that the flow limiting functions do not interact with one another.

Referring to FIG. 1, a distributed bleed temperature management system 10 includes a supplier side 12 and a consumer side 14. The consumer side may include a plurality of consumers 16. The consumers 16 may include, for example, air conditioning systems, wing ice protection systems, fuel tank inerting systems and the like. Each consumer 16 may be assigned a particular importance which may be used to control bleed air flow, as discussed below.

An engine 18 may include a high pressure bleed 20, an intermediate pressure bleed 22 and a fan air port 24. The flow from the fan air port 24 may be controlled by a fan air valve 26 to provide an air flow through an air/air heat exchanger 28. The high pressure bleed 20 may include a high pressure bleed valve 30 to control the output pressure of the bleed system during operation on the high pressure bleed port 20. The intermediate pressure bleed 22 may include a pressure regulator bleed valve 32 for controlling the output pressure of the bleed system during operation on the intermediate pressure bleed port 22.

A temperature sensor 34 may be disposed downstream of the heat exchanger 28 to measuring temperature of the gas flow from the pressurized air source. The gas flow may be split for various consumers 16, such as consumer 1, consumer 2 and consumer 3. Each consumer flow path 36-1, 36-2, 36-3 may include a flow sensor 38-1, 38-2, 38-3 and a load control valve 40-1, 40-2, 40-3 for each consumer.

Referring to FIG. 2, typically the fan air valve 26 may be controlled by a process flow 42 wherein the measured temperature $T_m$ (measured from the temperature sensor 34) is subtracted from the standard control setpoint $T_1$. This difference may be used to control the flow of air through the heat exchanger 28. This system alone, however, may not ensure that a bleed air system overtemperature does not occur during abnormal or failure scenarios.

Referring to FIG. 3, a further control scheme 44 may be used for consumer flow control, rather than supplier flow control, as is typically used in conventional systems. Each of the consumers 16 may have a different temperature limit at which the consumed flow is limited to maintain a given bleed system exit temperature. The temperature setpoints $T_2$ through $T_n$ may be separated by a minimum temperature (based on, for example, the sensor and control tolerances) to ensure that the flow limiting functions (for each consumer) do not interact with each other. For example, the control scheme 44 for consumer 1 may include a temperature setpoint $T_2$, which may be defined as $T_1$ plus a separation constant. Flow for consumer 1 may be controlled by the load control valve 40-1 based on the difference between the measured temperature $T_m$ and the setpoint temperature $T_2$. Similarly, the control scheme for consumer 2 may include a temperature setpoint $T_3$, which may be defined as $T_2$ plus a separation constant. Flow for consumer 2 may be controlled by the load control valve 40-2 based on the difference between the measured temperature $T_m$ and the setpoint temperature $T_3$.

The temperature setpoints may be selected for each consumer based on relative importance of that particular consumer. For example, the consumer that is the most important may have the highest setpoint and may be impacted last. In some embodiments, the flow control limits may be customizable based on consumer need. In still other embodiments, flow control may be time based, where one consumer receives full flow for a certain period of time, and then another consumer receives full flow for another period of time. In other embodiments, a hybrid flow control may be adopted—for example, where temperature setpoints are used in conjunction with time-based flow control. In any of the above cases, the flow control may rest on the consumer side rather than the supplier side.

It should be understood, of course, that the foregoing relates to exemplary embodiments of the invention and that modifications may be made without departing from the spirit and scope of the invention as set forth in the following claims.

We claim:

1. A distributed bleed air temperature management system for protecting consumer systems from over-temperature of bleed air, the system comprising:
   a heat exchanger for cooling bleed air passing through the heat exchanger to a desired output temperature;
   a valve controlling a flow of cooling air through the heat exchanger, cooling bleed air responsive to a desired output temperature;
   a temperature sensor, directly downstream of, and adapted to measure a temperature of a flow of bleed air emerging from, the temperature-regulating heat exchanger;
   a plurality of lines, all of which are parallel to one another and directly connected downstream to the temperature sensor, each of the plurality of lines adapted to deliver a respective portion of the flow of bleed air to a corresponding one of a plurality of consumer systems;
   a plurality of flow sensors directly downstream of the temperature sensor, a respective flow sensor being in each of a corresponding line of the plurality of lines;
   a plurality of load control valves, a respective load control valve being downstream of the heat exchanger, being directly downstream of each of a corresponding flow sensor of the plurality of flow sensors, and being adapted to change flow amount and flow time of a corresponding one of the portions of bleed air to a corresponding one of the plurality of consumer systems in the event that the heat exchanger fails to cool bleed air to a temperature at least as low as the desired output temperature and in the event that temperature of bleed air emerging from the heat exchanger, as measured by the temperature sensor, exceeds a temperature set point of one or more of the load control valves;
   wherein one or more of the load control valves of consumer systems includes a respective first temperature setpoint that is substantially equal to the desired output temperature of the heat exchanger and said first temperature setpoint exceeds said desired output temperature of the heat exchanger by an amount that is no greater than a separation constant:
   wherein one or more of the load control valves have temperature set points that are higher than the first temperature set point;
   wherein each respective temperature setpoint is based on an importance of each consumer system relative to the other consumer systems so that, when temperature of bleed air emerging from the heat exchanger, as measured by the temperature sensor, exceeds a temperature set point of any one of the load control valves, bleed air flow through the heat exchanger is reduced resulting in a reduction of the temperature of the bleed air reaching the load control valves and the most important ones of the consumer systems experience the least reduction of bleed air one of:
   flow amount; flow time; or
   flow amount and flow time.

2. The distributed bleed air temperature management system of claim 1, wherein the reduction of the portion of bleed air to a first one of the consumer systems is proportional to an amount by which a first temperature setpoint is exceeded by the temperature of the flow of bleed air.

3. The distributed bleed air temperature-management system of claim 2, wherein the reduction of the portion of flow of bleed air to a second one of the consumer systems is proportional to an amount by which a second temperature setpoint is exceeded by the temperature of the flow of bleed air emerging from the heat exchanger, wherein the second temperature setpoint is offset from the first temperature setpoint by at least a predetermined separation constant.

4. The distributed bleed air temperature management system of claim 3, wherein the consumer system that is most important has the highest temperature setpoint thus ensuring that the performance of the highest priority consumer system is impacted last.

5. The distributed bleed air temperature management system of claim 1, further comprising a flow control limit for each of the consumer systems.

6. A method for controlling bleed air flow to a plurality of consumer systems to protect the consumer systems from over-temperature of bleed air emerging from a temperature-regulating heat exchanger comprising:
   cooling bleed air in the heat exchanger with a flow of cooling air, said flow of cooling air being controlled responsively to a desired output temperature of bleed air emerging from the heat exchanger;
   measuring a temperature of bleed air flow with a temperature sensor to determine a temperature of the bleed air flow at an output of the temperature-regulating heat exchanger;
   reducing bleed air flow through the heat exchanger if measured temperature of the bleed air exceeds the desired bleed air output temperature by performing the steps;

splitting the flow of bleed air exiting the temperature sensor into a plurality of portions of bleed air so that each portion is delivered to one of the consumer systems;

altering, by the use of a plurality of respective flow sensors directly downstream of the temperature sensor and a plurality of respective control valves downstream of the heat exchanger and directly upstream of a respective consumer system, a respective time of flow of corresponding ones of the portions of bleed air to the corresponding consumer systems;

wherein the respective control valves are operated responsively to temperature set points for the respective control valves, wherein a temperature setpoint for at least one of the control valves is substantially equal to the desired bleed air output temperature;

wherein temperature setpoints for one or more of the control valves is higher than the desired bleed air output temperature; and wherein the respective times of flow are based on a need of each consumer system so that the most needy ones of the consumer systems experience the least reduction of flow time while bleed air output temperature, as measured by the temperature sensor, exceeds a desired bleed air output temperature of the bleed air.

7. The method of claim 6, wherein a temperature setpoint is set the highest for the most important one of the plurality of consumers systems.

8. The method of claim 7, wherein values of temperature setpoints are associated with the consumer systems and are different from one another by at least a separation constant.

9. A method for controlling portions of a flow of bleed air to a plurality of respective consumer systems, comprising:

passing the bleed air through a heat exchanger at a controlled flow rate, the flow rate being controlled downstream of the heat exchanger;

passing cooling air through the heat exchanger to cool the bleed air to a desired output temperature;

measuring output temperature of bleed air emerging from the heat exchanger with a temperature sensor;

arranging a respective control valve immediately upstream of each respective consumer system;

arranging a respective flow sensor immediately upstream of each respective control valve;

wherein each respective flow sensor, control valve and consumer system operate in parallel with the other respective flow sensors, control valves, and consumer systems;

assigning a respective temperature setpoint to each of the plurality of consumer systems;

wherein at least one of the setpoints is substantially equal to desired output temperature of bleed air emerging from the heat exchanger;

wherein one or more of the setpoints is higher than the desired output temperature of bleed air emerging from the heat exchanger;

wherein the respective temperature setpoints are based on one of consumer importance and consumer need of the respective consumer systems;

in the event that the heat exchanger fails to cool bleed air to a temperature at least as low as the desired output temperature and in the event that temperature of bleed air emerging from the heat exchanger, as measured by the temperature sensor, exceeds a temperature set point for one or more of the load control valves, initiating one of:

altering a respective amount of time that a respective portion of bleed air is delivered to one or more of the plurality of consumer systems;

altering a respective amount of the portion of bleed air flow delivered to one or more of the plurality of consumer systems;

wherein, said steps result in a reduction of bleed air flow through the heat exchanger and a reduction of the temperature of bleed air reaching the control valves of the consumer systems.

10. The method of claim 9, wherein the temperature setpoint is set the highest for the most important one of the plurality of consumer systems.

11. The method of claim 9, wherein values of the temperature setpoints of the plurality of consumer systems are different from each other by at least a separation constant.

12. The method of claim 9, further comprising measuring flow of bleed air delivered to each of the plurality of consumer systems.

* * * * *